United States Patent [19]

Matsushita et al.

[11] Patent Number: 5,121,931
[45] Date of Patent: Jun. 16, 1992

[54] NONCONTACT MECHANICAL SEAL

[75] Inventors: Mitsuyoshi Matsushita; Nobuhiro Matsumoto, both of Tokyo, Japan

[73] Assignee: Tanken Seiko Kabushiki Kaisha, Tokyo, Japan

[21] Appl. No.: 610,351

[22] Filed: Nov. 7, 1990

[30] Foreign Application Priority Data

Dec. 7, 1989 [JP] Japan .................. 1-318177

[51] Int. Cl.$^5$ .................. F16J 15/34; F16J 15/54
[52] U.S. Cl. .................. 277/96.2; 277/96; 277/96.1; 277/83; 277/81 R
[58] Field of Search .......... 277/83, 85, 96, 96.2, 277/96.1, 27, 82, 87, 81 R

[56] References Cited

U.S. PATENT DOCUMENTS

| | | | |
|---|---|---|---|
| 2,491,233 | 12/1949 | Vedovell | 277/81 R |
| 2,884,268 | 4/1959 | Amirault et al. | 277/83 |
| 2,937,039 | 5/1960 | Santapa | 277/81 |
| 3,093,382 | 6/1963 | Macks | 277/96 |
| 3,389,921 | 6/1968 | Lojkutz | 277/96.2 X |
| 3,462,159 | 8/1969 | Baumann et al. | 277/83 |
| 3,652,183 | 3/1972 | Pottharst, Jr. | 277/96.2 X |
| 4,103,907 | 8/1978 | Inouye et al. | 277/96.1 |
| 4,165,085 | 8/1979 | Persson | 277/96.2 X |
| 4,277,072 | 7/1981 | Forch | 277/96.2 X |
| 4,291,887 | 9/1981 | Etsion et al. | 277/27 |
| 4,445,695 | 5/1984 | Wilkinson | 277/96.1 X |
| 4,776,598 | 10/1988 | Akema | 277/96.2 X |
| 4,799,693 | 1/1989 | Johnston | 277/96.1 |
| 4,997,192 | 3/1991 | Nagai et al. | 277/96.2 X |

FOREIGN PATENT DOCUMENTS 543907   1/1956   Belgium .................. 277/85

Primary Examiner—William A. Cuchlinski, Jr.
Assistant Examiner—James K. Folker
Attorney, Agent, or Firm—Frishauf, Holtz, Goodman & Woodward

[57] ABSTRACT

A noncontact mechanical seal has a seal ring which includes a sealing face portion formed by ventilative porous materials and a ventilating portion to pass a gas of a high pressure side to the sealing face portion from the back side of said sealing face portion. The sealing face portion is preferably a porous ring independently formed of said seal ring and mounted on the seal ring providing a space at the back side thereof. The seal ring preferably is provided with a small diameter thin portion at the portion forming the bottom of the space.

10 Claims, 3 Drawing Sheets

NONCONTACT MECHANICAL SEAL

FIELD OF THE INVENTION

The present invention relates to a noncontact mechanical seal.

BACKGROUND OF THE INVENTION

Noncontact seals are utilized to seal gas or the like. Noncontact seals include seal faces where high pressure gas is induced to keep the seal faces out of contact with each other. Such noncontact seals are provided at the sealing face with a very slightly tapered portion, a circle groove, a thin air flow hole or a spirally radial groove to induce high pressure gas to the sealing face thereof.

However it is hard (it increases the cost) to form the tapered portion, the groove or the hole with a high accuracy. In noncontact seals the seal faces are not completely noncontact; they contact each other slightly owing to vibration and/or poor accuracy of machining. Such contact causes wear of the sealing faces and deformation of the grooves follows. Thus the sealing ability of noncontact seals become worse as the sealing faces wear and therefore noncontact seals cannot keep providing stable and reliable sealing.

Furthermore the hole and the groove can sometimes be bigger than the required size because of difficulty of forming of small grooves, holes or the like and because of the need to make an allowance for the wear of sealing faces caused by vibration. Such a bigger groove and hole permits entry of more air, that separates the sealing faces too much and makes fine adjustment of the gap between the sealing faces difficult.

SUMMARY OF THE INVENTION

An object of the invention is to provide a noncontact mechanical seal which does not need boring or grooving on the sealing faces.

Another object of the invention is to provide a noncontact mechanical seal which permits fine adjustment of the gap between the sealing faces.

A further object of the invention is to provide a noncontact mechanical seal which can provide stable reliable sealing.

DETAILED DESCRIPTION OF THE PREFERRED EMBODIMENTS

Figure 1:
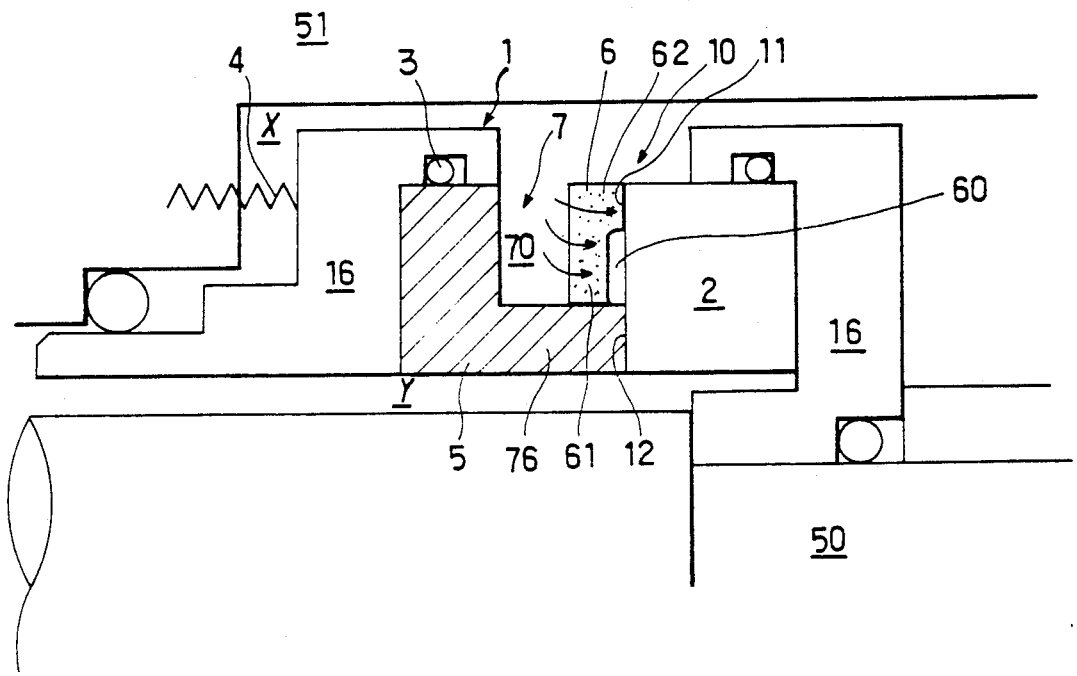
FIG. 1 is a part cross sectional view showing one embodiment of the invention.

Now referring to FIG. 1, a nonrotary seal ring 1 (positioned on the high pressure side X) is slidablly mounted on a casing 51. The nonrotary seal ring 1 is slidable by means of a spring 4 and consists of a back metal, a nonosmotic ring 5 inserted in the back metal 16 and a porous ring 6 mounted on the nonosmotic ring 5. The nonosmotic ring 5 is made of nonosmotic materials and is not ventilative. A rotary seal ring 2 is rotatably mounted on a rotary shaft 50 through back metal 16.

The porous ring 6 of the nonrotary seal ring 1 is made of ventilative porous materials, for example sintered metals (i.e. sintered carbon or sintered copper alloy or the like) or porous resin or the like. The porous ring 6 is secured on a outer part of a small diameter thin portion 76 formed at the nonosmotic ring 5 with glue or by shrink fitting. Thus the sealing face 10 of the nonrotary seal ring 1 comprises the porous sealing face 11 of the porous ring 6 and the nonosmotic sealing face 12 of the nonosmotic ring 5.

There is a gap behind the porous ring 6 and a ventilating portion 7 is provided therewith. The ventilating portion 7 induces the high pressure gas in the high pressure side X, to the porous ring 6. The ventilating portion 7 in this embodiment is a circular ventilating groove 70 provided on the side of the nonrotary seal ring 1. The ventilating groove 70 is positioned along with the back of the porous ring 6 to induce the high pressure gas to the back of the porous ring 6.

Figure 5:
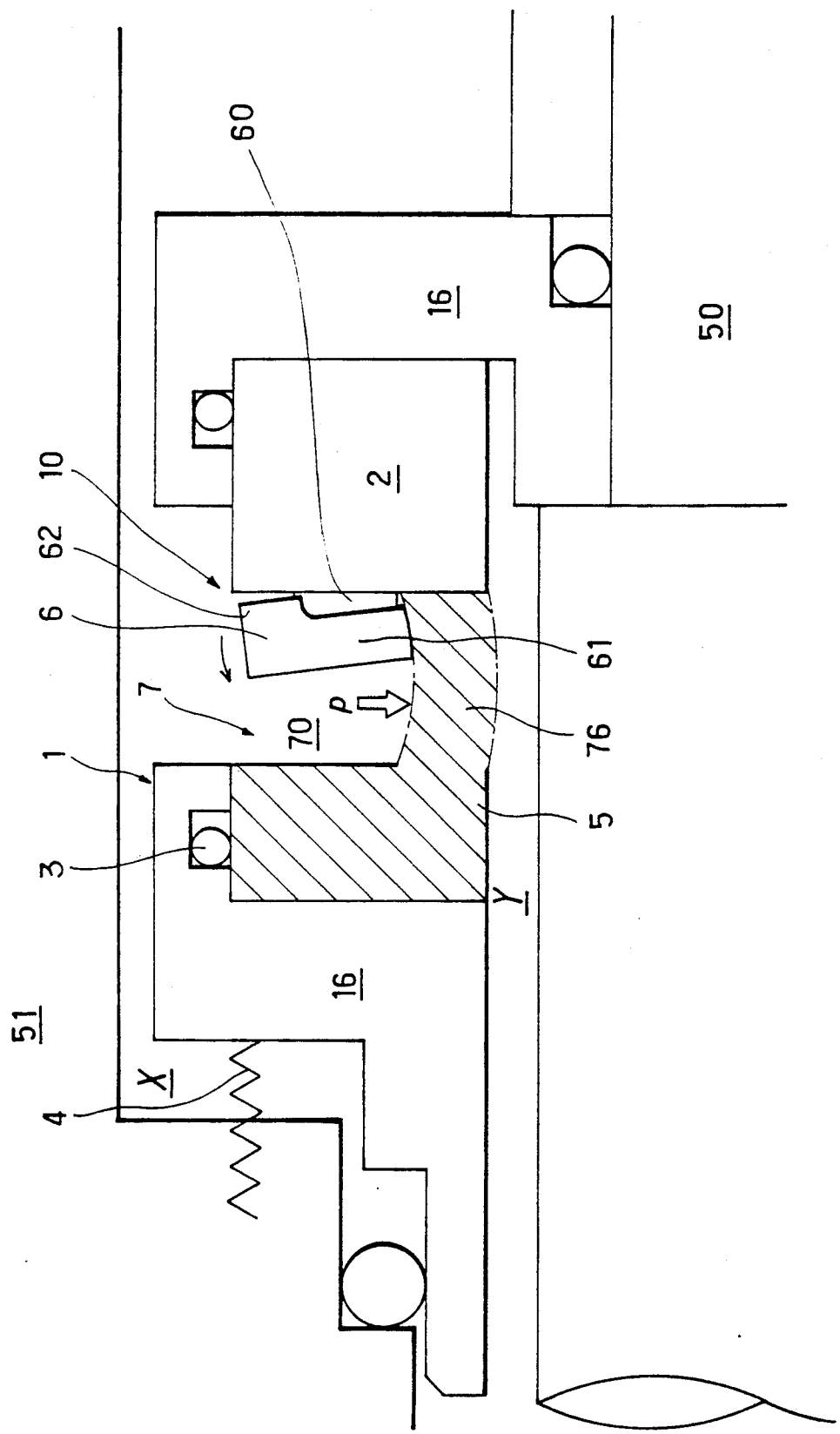
FIG. 5 is an explanatory view showing the movement of a porous ring.

As shown in FIG. 5 since the small diameter thin portion 76 is more bendable and elastic than other parts of the nonosmotic ring 5 by high pressure, therefore the porous ring 6 mounted on the end of the elastic small diameter thin portion 76 moves in the axial direction as indicated by the arrow shown in FIG. 5 due to the bending of the small diameter thin portion 76 to separate fringe 62 from ring 2. The outer fringe 62 of the porous ring 6 however would tend to move toward and improperly touch the rotary seal ring 2 because of distortion by the high pressure gas in the high pressure side X. However, the movement indicated by the arrow above the porous ring 6 suppresses the unwanted touching of the outer fringe 62 on the rotary seal ring 2.

The porous sealing face 11 of the porous ring 6 is provided with a relief groove 60 extending radially from the inner part thereof. The relief groove 60 functions as a collection space for the gas passing through the ventilating groove 70 and the porous ring 6 from the high pressure side X and it makes the gas pressure distribution between the sealing face of the porous ring 6 and the rotary seal ring 2 more even and maintains a noncontact condition between the porous ring 6 and the rotary seal ring 2. Furthermore the relief groove 60 creates a thin portion 61 at the base part of the porous ring 6, so the porous ring 6 becomes more bendable and the outer fringe 62 becomes more movable in the axial direction or the thin portion 61 exerts pressure on porous ring 6.

Though the porous ring 6 is provided only for the nonrotary seal ring 1 in the embodiment shown in FIG. 1, another porous ring may be provided for the rotary seal ring 2. Furthermore, the porous rings may be provided on both the nonrotary seal ring 1 and the rotary seal ring 2. The nonrotary seal ring 1 is mounted on the back metal 16 with an O ring 3 in the embodiment, however the nonrotary seal ring 1 can be mounted on the back metal 16 by shrink fitting without using an O ring.

Figure 2:
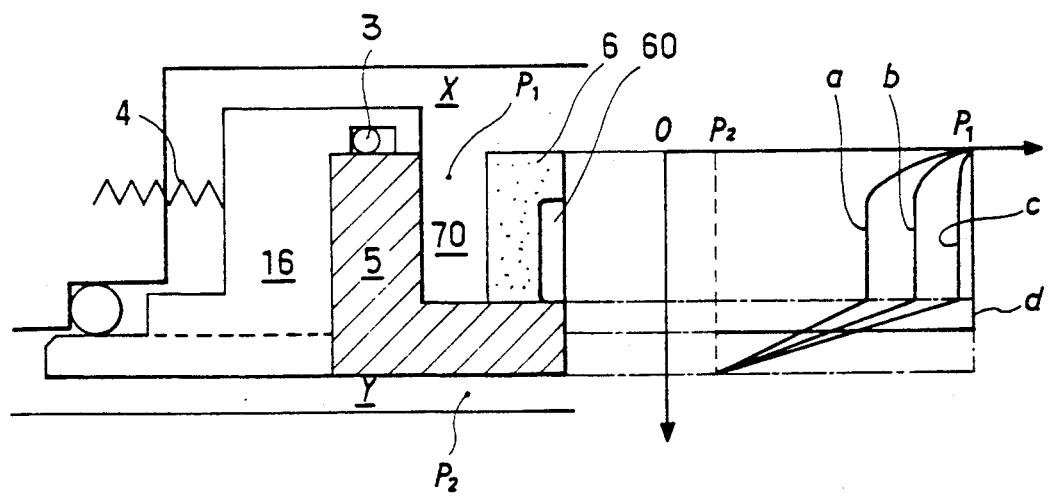
FIG. 2 is an explanatory view showing the pressure distribution in the gap between the sealing faces of the mechanical seal shown in FIG. 1.

In such mechanical seal shown in FIG. 1, the high pressure gas in the high pressure side X flows through the ventilating groove 70, the porous ring 6 and the porous sealing face 11 toward the rotary seal ring 2. The gas in the relief space 60 maintains some gas pressure. The distribution of the pressure at the sealing face of the nonrotary seal ring 1 is shown in FIG. 2 as lines a, b and c. A line d represents the pressure which the back end of the nonrotary seal ring 1 receives. When the sealing face of the nonrotary seal ring 1 is closest to the sealing face of the rotary seal ring 2, as shown in FIG. 1 the pressure on the face is high as shown by line c. When the nonrotary seal ring 1 is more distant from the rotary seal ring 2, as shown in FIG. 5, the pressure decreases in the gap therebetween as shown by line a and this creates a vacuum force. Thus the pressure in the gap will then increase the balance with the force pushing the nonrotary seal ring 1 toward the rotary seal ring 2 at the line b, and the operation is carried out at this stable condition.

Since ventilation (or flowing the gas) through the porous ring 6 can be made very small, the gap between the nonrotary seal ring 1 and the rotary seal ring 2 can be very small. The gap is adjustable by controlling the balance factor of the nonrotary seal ring 1 and/or the ventilation of the porous materials of the porous ring 6. The ventilation may be decreased by reducing the number or the diameter of pores, so that the gap between the nonrotary seal ring 1 and the rotary seal ring 2 can be reduced. On the other hand the gap can be enlarged by increasing the number or the diameter of the pores. Such adjustment of the gap can be controlled by adjusting the thickness in the axial direction of the porous ring 6.

It is easier to mount the porous ring 6 on the nonosmotic ring 5 than to form holes on sealing faces in the prior art. The small diameter thin portion 76 of the nonosmotic ring 5 gives elasticity to the nonosmotic ring 5 to bend the portion 76 so as to move the outer fringe 62 apart from the rotary seal ring 2, which prevents improper contact between the outer fringe 62 and the rotary seal ring 2 and the extraordinary torque generated at the rotary seal ring 2 by such contact. Furthermore the relief groove 60 provides the porous ring 6 with the thin portion 61 which also gives elasticity to the porous ring 6 per se and the unwanted contact between the outer fringe 62 and the rotary seal ring 2 is further effectively prevented thereby.

Figure 3:
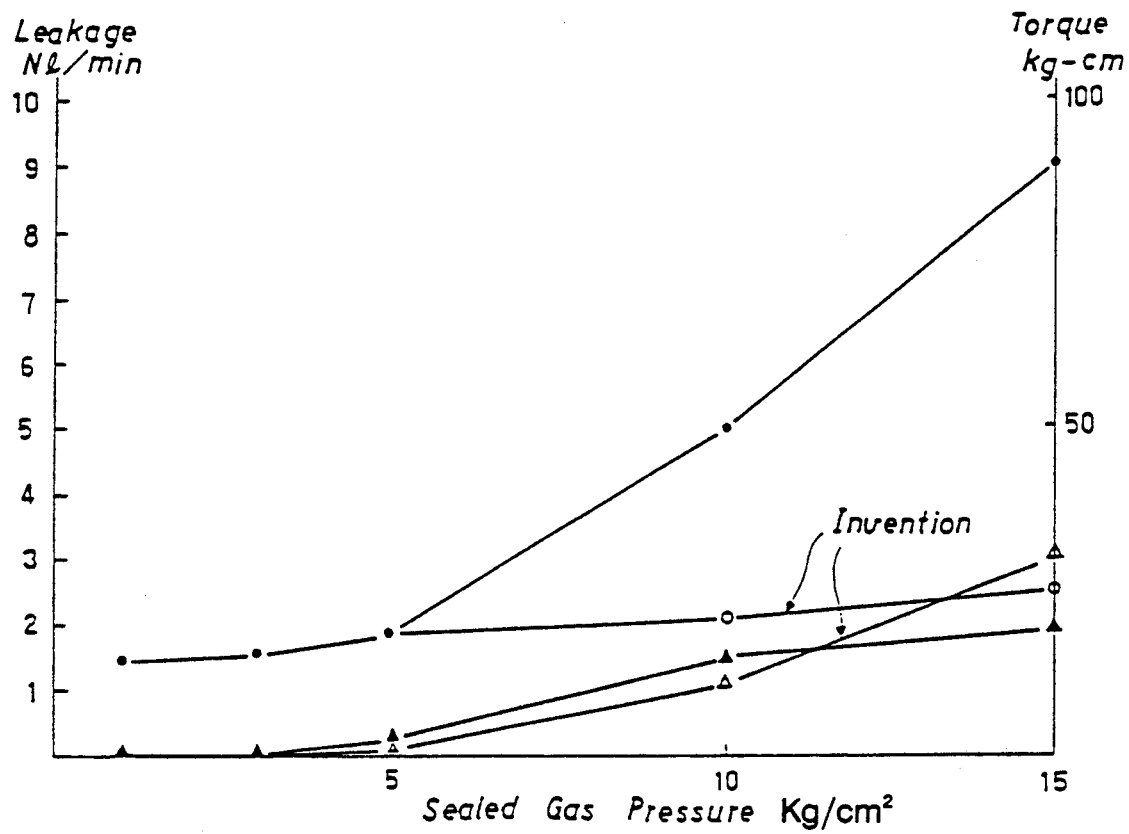
FIG. 3 is a graph showing the relation between Leakage/Torque and sealed gas pressure.

FIG. 3 shows a graph indicating the difference of the values of leakage and contact torque between the noncontact mechanical seal of FIG. 1 and the noncontact mechanical seal of the prior art which include holes for ventilation and cannot provide elasticity. White circles indicate the rotation torque of the embodiment of FIG. 1 and white triangles indicate the leakage of the embodiment. Black circles indicate the rotation torque of the prior art and black triangles indicate the leakage of the prior art. The abscissa expresses the gas pressure of the sealed gas in the high pressure side X.

Since the mechanical seal of the invention provides an elasticity effect at the outer fringe 62, unwanted contact does not happen and therefore the rotation torque is small. Furthermore it is obvious that the leakage is larger at higher pressure than the prior art because of the small gap of the sealing faces. On the other hand, the torque of the prior mechanical seal increase as the pressure in the high pressure side X increases as shown by the black circles in FIG. 33, which is caused by the bending of the outer fringe of the sealing ring of the prior art toward the opposite counter sealing ring due to the pressure in the high pressure side X.

In the present invention the outer fringe 62 can move apart from the rotary seal ring 2 due to the bending of the small diameter thin portion 76 and the bending of the thin portion 61 which prevents the abnormal contact, and consequently the rotation torque does not increase.

Figure 4:
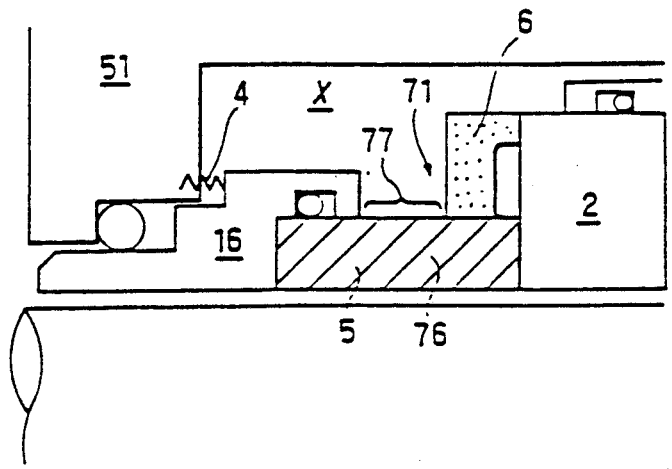
FIG. 4 is a part cross sectional view showing another embodiment of the invention.

FIG. 4 shows another embodiment where a ventilating cutout 71 is provided as the ventilating portion 7.

The portion of the nonosmotic ring 5 facing the back side of the porous ring 6 is completely eliminated, and the back of the porous ring 6 is completely exposed in the high pressure side X. The ventilating cutout 71 can make the range of the small diameter thin portion 76 wide so that the area of a pressure receiving portion 77 which receives the pressure of the gas in the high pressure side X increases. Such a wide pressure receiving portion 77 can increase the movement of the porous ring 6 in the opposite direction toward the rotary seal ring 2.

In those described embodiments the gas of the high pressure side X flowing from the porous sealing face 11 of the porous ring 6 creates the predetermined gap between the sealing faces of the nonrotary seal ring 1 and the rotary seal ring 2, that provides the reliable noncontact sealing. The ventilation of the porous materials of the porous ring 6 can be easily reduced so as to make the gap smaller.

The ventilation of the porous ring 6 may not substantially change as the face of the porous ring 6 wears, which is contrary to prior noncontact mechanical seals. This provides stable and reliable sealing.

Furthermore it is easier to mount the porous ring 6 on the nonosmotic ring 5 than to form holes or grooves on a sealing face. The small diameter thin portion 76 permits bending of the outer fringe 62 so as to prevent abnormal contact between the outer fringe 62 and the rotary seal ring 2.

What is claimed is:

1. A non-contact mechanical seal, comprising:
   first and second seal rings forming a sealing face therebetween;
   at least said first seal ring including a seal face portion comprising ventilative porous materials;
   at least said first seal ring having a thin wall portion disposed adjacent to said seal face portion, said thin wall portion being bendable upon application of a gas pressure from a high pressure gas source thereto; and
   a ventilating space formed between said first and second seal rings, said ventilating space being defined, at least in part by said thin wall portion of said first seal ring, and said ventilating space receiving the gas pressure from the high pressure gas source to apply a pressure to said thin wall portion of said first seal ring; and
   said thin wall portion of said first seal ring being bendable responsive to gas from said high pressure gas source in said ventilating space being applied thereto, to separate and open the sealing face formed by said first and second seal rings.

2. A non-contact mechanical seal according to claim 1, wherein said first seal ring comprises a radial arm portion and a short arm portion extending from said radial arm portion and which together form a substantially L-shaped portion, with the short arm portion of the L being shorter than the radial arm portion of the L; and
   wherein the radial arm portion of the L includes the thin wall portion of said first seal ring.

3. A non-contact mechanical seal according to claim 2, wherein the seal face portion of said first seal ring includes the short arm portion of said substantially L-shaped portion.

4. A non-contact mechanical seal according to claim 3, wherein said first seal ring including said substantially L-shaped portion and said second seal ring are positioned adjacent each other so as to define the ventilating space between the short arm portion and the radial arm portion of the L and said second seal ring, said ventilating space receiving gas passing through said seal face portion of said first seal ring which comprises said ventilative porous material, the gas pressure in said ventilating space providing a pressure on said thin wall portion of said first seal ring which opposes the pressure from the high pressure source.

5. A non-contact mechanical seal according to claim 2, wherein said substantially L-shaped portion comprises a separate ring member.

6. A non-contact mechanical seal according to claim 2, wherein said short arm portion comprises said ventilative porous material, and at least said radial arm portion comprises a nonosmotic material.

7. A non-contact mechanical seal according to claim 5, wherein:
said first seal ring includes a thin bendable member;
the radial arm portion of the substantially L-shaped portion that is remote from the short arm portion of the substantially L-shaped portion has a free end portion, said free end portion abutting against said thin bendable member;
said thin bendable member having a portion defining in part said ventilating space;
said thin bendable member being bendable when gas from said high pressure gas source is provided to said ventilating space; and
said abutting free end portion of said substantially L-shaped portion exerting pressure on said thin bendable member, as said thin wall portion of said first seal ring bends when said gas of said high pressure gas source is applied thereto.

8. A non-contact mechanical seal according to claim 1, wherein at least one of the first and second seal rings is a rotatable seal ring.

9. A non-contact mechanical seal according to claim 1, wherein at least one of the first and second seal rings is a non-rotatable seal ring.

10. A non-contact mechanical seal according to claim 1, wherein said second seal ring includes a seal face portion comprising a nonosmotic material.

* * * * *